(12) United States Patent
Lee

(10) Patent No.: US 7,297,416 B2
(45) Date of Patent: Nov. 20, 2007

(54) PHOTOLUMINESCENT TILE AND METHOD FOR FABRICATING THE SAME

(75) Inventor: Yong Jae Lee, Seoul (KR)

(73) Assignee: Seoul Ceramics Co., Ltd., Gimhae-shi (KR)

( * ) Notice: Subject to any disclaimer, the term of this patent is extended or adjusted under 35 U.S.C. 154(b) by 395 days.

(21) Appl. No.: 10/832,295

(22) Filed: Apr. 27, 2004

(65) Prior Publication Data

US 2004/0214042 A1 Oct. 28, 2004

(30) Foreign Application Priority Data

Apr. 28, 2003 (KR) .................... 10-2003-0026734

(51) Int. Cl.
*H01J 1/62* (2006.01)
(52) U.S. Cl. .................................................. 428/690
(58) Field of Classification Search ............... 428/690; 252/301.16, 301.36; 362/84, 812
See application file for complete search history.

(56) References Cited

FOREIGN PATENT DOCUMENTS

| CN | 1236754 | 12/1999 |
|----|---------|---------|
| JP | 61-77690 | 4/1986 |
| JP | 11-293123 | 10/1999 |
| JP | 2000-72533 | 3/2000 |
| JP | 2002-293668 | 10/2002 |
| JP | 2003-206189 | * 7/2003 |
| KR | 10-1999-0058711 | 7/1999 |
| KR | 1999-0058711 | 7/1999 |
| KR | 20-0163255 | 2/2000 |
| KR | 2003-0032407 | 4/2003 |
| KR | 20-0314090 | 5/2003 |
| KR | 2003-082673 | * 10/2003 |

OTHER PUBLICATIONS

International Search Report mailed Jan. 30, 2004, for International application No. PCT/KR2003/000895.
Notice of Rejection mailed Oct. 26, 2005, issued by the Korean Intellectual Property Office in counterpart Korean Application No. 10-2004-0029074, and English translation thereof.
First Notification of Office Action from the State Intellectual Property Office of China mailed Feb. 9, 2007, in counterpart Chinese patent application No. 03826306.8.

* cited by examiner

*Primary Examiner*—Rena Dye
*Assistant Examiner*—Camie S. Thompson
(74) *Attorney, Agent, or Firm*—Finnegan, Henderson, Farabow, Garrett & Dunner, L.L.P.

(57) ABSTRACT

Disclosed are photoluminescent tiles containing photoluminescent materials, and manufacturing methods thereof. A tile is filled or glazed with photoluminescent glaze powder including photoluminescent phosphor comprising a $MAl_2O_4$ compound (M: metal) as a matrix, and then baked, thereby obtaining the photoluminescent tiles. Since the photoluminescent tiles can be manufactured via a dry process, the manufacturing method is convenient and enables mass production via process automation. Additionally, the photoluminescent tiles of the present invention can be baked at a high temperature, and do not have degradations, such as fine cracks on the photoluminescent materials.

36 Claims, 5 Drawing Sheets

PHOTOLUMINESCENT TILE AND METHOD FOR FABRICATING THE SAME

This application is based on and claims priority under 35 U.S.C. §119 (a)-(d), based on Korean Patent Application No. 10-2003-0026734, filed on Apr. 28, 2003, the entire contents of which are incorporated herein by reference.

BACKGROUND OF THE INVENTION

1. Field of the Invention

The present invention generally relates to a photoluminescent tile and a method for preparing the same, and more specifically, to a photoluminescent tile prepared by filling or glazing photoluminescent glaze powder on a tile, wherein the photoluminescent glaze powder is obtained by dry-mixing a photoluminescent phosphor which comprises a compound expressed by $MAl_2O_4$ (M: metal) as a host crystal with frit, and then burning the tile filled and glazed with the photoluminescent glaze powder, and a method for fabricating the same using a dry method.

2. Background of the Prior Art

Generally, tiles are highlighted as excellent building materials to protect the coated surface of the structure because they have excellent physical characteristics such as durability, water-resistance and abrasion resistance, enable simple construction, and are not cracked or discolored.

However, since ties do not show their shapes in a dark place, they have a demerit that their construction or shapes are not shown.

Meanwhile, when an internal power is not supplied to underground construction or buildings in an emergency, there is no means for indicating an emergency exit path, which may result in a large accident.

Currently, various kinds of luminous signs have been known, and positioned on a specific base by using luminous paints or luminous plastic materials such as a luminous tape, a sticker or an acryl plate. Radiation effects of these signs are not continued for a long time after light disappears, and they do not display their original functions when they are burned in case of fire. When mounted on the bottom, conventional signs are worn away by various factors in a short time. Due to these problems, the conventional photoluminescent signs need to be maintained frequently, which costs large maintenance expenses.

Korean Patent Publication No. 1999-58711 (1999. 7. 15) discloses a method for fabricating a conventional luminous tile. In the method, luminous glaze obtained by mixing 20~60 wt % $SrAl_2O_3$ with 40~80 wt % frit is mixed with water, and wet-glazed on the tile. Then, the tile wet-glazed with the luminous glaze is burned at a temperature ranging from 600 to 800° C. The wet-glazing process of such luminous glaze by hands causes cracking, surface blotting and pin-holes, thereby degrading the yield of products. Specifically, in every 100 products, the number of defectives resulting from the cracking reaches about 17, the number of defectives resulting from the surface blotting reaches about 13, and the number of defectives resulting from the surface pin-holes reaches about 10. In addition, due to physical property of luminous glaze, the tile is burned at a low temperature, thereby degrading abrasion resistance of the tile. When the luminous glaze is wet-glazed on a tile having elaborate decorative patterns and various colors, the beauty of native patterns and colors are halved.

Accordingly, the present inventors have developed a novel photoluminescent tile and a method for fabricating the same in order to avoid the above described problems.

SUMMARY OF THE INVENTION

Disclosed is a photoluminescent tile prepared by filling or glazing photoluminescent glaze powder on a partial tile or the whole surface of the tile, wherein the glaze powder is obtained by dry-mixing a photoluminescent phosphor which comprises a compound expressed by $MAl_2O_4$ (M: metal) as a host crystal with frit, and then burning the tile filled or glazed with the photoluminescent glaze powder, and a method for preparing the same.

In an embodiment, there is provided a photoluminescent tile fabricated by filling or dry-glazing photoluminescent glaze powder on a tile, wherein the photoluminescent glaze powder is obtained by dry-mixing a 50~90 wt % photoluminescent phosphor which comprises a compound expressed by $MAl_2O_4$ (M: metal) as a host crystal with a 10~50 wt % frit, and then burning the tile filled or dry-glazed with the photoluminescent glaze powder at a temperature ranging from 500 to 1200° C. A preparing method thereof is also provided.

As described above, the photoluminescent glaze powder is fabricated by dry mixing a 50~90 wt % photoluminescent phosphor which comprises a compound expressed by $MAl_2O_4$ (M: metal) as a host crystal with a 10~50 wt % frit.

Preferably, metal M is (i) selected from calcium (Ca), strontium (Sr), barium (Ba) and mixtures thereof, or is (ii) an alloy of the metal of (i) and magnesium (Mg).

Preferably, the photoluminescent phosphor comprises europium (Eu) as an activator, and at least one or more co-activator selected from the group consisting of cerium (Ce), praseodymium (Pr), neodymium (Nd), samarium (Sm), dysprosium (Dy), holomiun (Ho), erbium (Er), thulium, (Tm), ytterbium (Yb) and lutetium (Lu).

A photoluminescent phosphor is a material whose light accumulating element accumulates light and radiates in a dark place. In an embodiment, LumiNova® produced by Stone Nemoto Co., Ltd., which satisfies the above condition and have an excellent sunproof characteristic and a long-time afterglow characteristic is used as a photoluminescent phosphor.

A frit, as a commercial mixture-obtained by burning silica and soluble flux and pulverizing them, is a pulverized material obtained by previously melting raw materials and making them as a glass state. In general, the frit is used as a single ingredient or by mixing other ingredients when tile glaze is fabricated.

In an embodiment, a particle having a predetermined size (60 mesh) is made by pulverizing a frit (HeGwang Ceramics. Co., Ltd.) for 800° C. (200 mesh), and drying the frit. Then, a photoluminescent glaze powder is fabricated by mixing the photoluminescent phosphor with the particle at a predetermined ratio.

A photoluminescent tile according to an embodiment of the present invention is fabricated by a dry method to fill or dry-glaze photoluminescent glaze powder in a tile. Due to the dry method, a photoluminescent tile may be fabricated by glazing photoluminescent glaze powder as a desired pattern on a flat tile depending on intended usage of tiles, or by filling photoluminescent glaze powder in grooves hollowed as predetermined shapes in a tile.

In an embodiment, the first and second methods for fabricating a photoluminescent tile are differentiated depending on the process of dry-glazing photoluminescent glaze powder on a flat tile or the process of filling photoluminescent glaze powder in grooves.

First, a method for fabricating a photoluminescent tile by filling photoluminescent glaze powder in grooves hollowed in a tile comprises the steps of (see FIG. 1):

(a) preparing a tile 1 wherein grooves 2 are hollowed with predetermined shapes;

(b) filling photoluminescent glaze powder 3 in the grooves 2, wherein the photoluminescent glaze powder 3 is obtained by dry-mixing a 50~90 wt % photoluminescent phosphor which comprises a compound expressed by $MAl_2O_4$ (M: metal) as a host crystal with a 10~50 wt % frit;

(c) dry-glazing a surface-protective frit 4 on the upper portion of the tile where the photoluminescent glaze powder 3 is filled; and (d) burning the tile dry-glazed with the surface-protective frit 4 at a temperature ranging from 500 to 1200° C.

In the step (a), the grooves of the tile are formed to have various patterns or representative signs. Grooves hollowed in a tile are previously prepared so that photoluminescent glaze may be filled in the grooves having decorative patterns or various representative sign patterns thereon.

Here, the grooves having predetermined shapes may be formed to have various patterns or representative signs with cast molding or carving. Preferably, the grooves of the tile are hollowed at a depth ranging from 0.3 to 2.0 mm.

In the step (b), the dried and powdered photoluminescent glaze is filled in the grooves of the tile prepared in the step (a). Although the filling step may be performed by hand, the filling process may be preferably performed using an automatic operation by machinery such as a silk screen device because the photoluminescent glaze is of a dry powder type.

In order to protect the grooves filled with the photoluminescent glaze powder, the surface-protective frit is dry-glazed to cover the filling region in the step (c). Since a dry method is used in an embodiment of the present invention, any of a low temperature burning frit usable at a temperature ranging from 500 to 900° C. or a high temperature burning frit usable at a temperature ranging from 900 to 1200° C. can be used. However, a high temperature burning frit is preferably used in an embodiment of the present invention in order to improve abrasion resistance of the tile.

The surface-protective flit used in the step (c) may be Vetrosa® for 830° C. or 950° C. produced by Korea Ceramics Co., Ltd. having a size ranging from 0.1 to 0.32 mm.

In the step (d), a photoluminescent tile is prepared by burning the tile dry-glazed with the surface-protective frit at a high temperature ranging from 500 to 1200° C. for about 30~80 minutes. The burning process is performed at a low temperature if the surface-protective flit used in the step (c) is a low temperature burning flit arid at a high temperature if the surface-protective frit used in the step (c) is a high temperature burning frit. However, it is preferable that the tile is burned at a high temperature ranging from 900 to 1200° C. in order to improve abrasion resistance of the tile.

Preferably, the tile fabricated by filling photoluminescent glaze powder in grooves of the tile is used as flooring tiles which require relatively more abrasion resistance because photoluminescent glaze is filled in the tile.

Second, a method for fabricating a photoluminescent tile by dry-glazing photoluminescent glaze powder on a flat tile comprises the steps of (see FIG. 2):

(a) preparing a flat tile 21 having no pattern;

(b) dry-glazing photoluminescent glaze powder 22 on the tile 21 in predetermined shapes, wherein the photoluminescent glaze powder 22 is obtained by dry-mixing a 50~90 wt % photoluminescent phosphor which comprises a compound expressed by $MAl_2O_4$ (M: metal) as a host crystal with a 10~50 wt % frit;

(c) dry-glazing a surface-protective frit 23 on the upper portion of the tile where the photoluminescent glaze powder is dry-glazed; and (d) burning the tile dry-glazed with the surface-protective frit 23 at a temperature ranging from 500 to 1200° C.

In the above-described process, a photoluminescent tile according to the present invention is fabricated by dry-glazing photoluminescent glaze powder on a flat tile instead of filling photoluminescent glaze powder in grooves hollowed in a tile.

In the step (b), photoluminescent glaze powder is put on the upper portion of the flat tile in various patterns or representative sign shapes by a silk screen method. The dry-glazing thickness of glaze powder is determined depending on the size, pattern and usage of tiles. Preferably, the dry-glazing thickness ranges from 0.3 to 2.0 mm.

When the photoluminescent glaze powder is dry-glazed by the above-described process, the region dry-glazed with the photoluminescent glaze powder protrudes from the flat tile at the dry-glazed thickness. Accordingly, the tile fabricated by the above-described process is suitable for manufacture of wall tiles which requires relatively less abrasion resistance.

The steps (c) and (d) are the same as those of the previously described method using grooves hollowed in a tile.

Third, there is also provided a photoluminescent tile fabricated by dry-glazing photoluminescent glaze powder on the whole surface of a tile coated with an adhesive material, wherein the photoluminescent glaze powder is obtained by dry-mixing a 10~50 wt % photoluminescent phosphor which comprises a compound expressed by $MAl_2O_4$ (M: metal) as a host crystal with a 10~50 wt % frit and a 40~80 wt % surface-protective frit, and then burning the tile dry-glazed with the photoluminescent glaze powder at a temperature ranging from 500 to 1200° C.

To begin with, photoluminescent glaze powder is prepared by dry-mixing a 10~50 wt % photoluminescent phosphor which comprises a compound expressed by $MAl_2O_4$ (M: metal) as a host crystal with a 10~50 wt % frit and a 40~80 wt % surface-protective frit.

Then, a photoluminescent tile is fabricated by dry-glazing the above photoluminescent glaze powder on the whole surface of a tile having elaborate patterns and/or various colors. As a result, a photoluminescent tile having a photoluminescent characteristic with its native color and patterns can be obtained.

In another embodiment a third method for fabricating a photoluminescent tile obtained by dry-glazing photoluminescent glaze powder on the whole surface of a common tile having elaborate patterns and/or various colors, comprises the steps of (see FIG. 3):

(a) preparing a tile 31 having elaborate decorative patterns 32 and/or various colors;

(b) coating an adhesive material on the whole surface of the tile 31;

(c) dry-glazing photoluminescent glaze powder 33 on the tile 31 coated with the adhesive material, wherein the photoluminescent glaze powder is obtained by dry-mixing a 10~50 wt % photoluminescent phosphor which comprises a compound expressed by $MAl_2O_4$ (M: metal) as a host crystal with a 10~50 wt % frit and a 40~80 wt % surface-protective frit; and (d) burning the tile whose whole surface is dry-glazed with the photoluminescent glaze powder at a temperature ranging from 500 to 1200° C. for 30~80 minutes.

The tile of the step (a) having elaborate decorative patterns or various colors include a common tile, a tile whose surface has predetermined grooves, a tile whose surface has predetermined patterns, a tile whose surface has no patterns with various colors, and a mosaic tile.

In the step (b), there are various materials usable for the adhesive material. For example, the adhesive material may be a sodium carboxylmethyl cellulose (CMC) aqueous solution prepared by mixing 0.5~5 weight parts of sodium carboxylmethyl cellulose in 100 weight parts of water, and then stirring for a predetermined period.

Here, the CMC, which is a tasteless, scentless and harmless chemical, increases viscosity of general aqueous products by improving viscosity transferability, formation of 3-dimensional gel structure, moisture balance, and fluid stress of aqueous solution and suspended solids when the CMC is dissolved in aqueous solution. Therefore, the CMC is frequently used in many industries as adhesives, detergents, cosmetics and medicines. When the CMC aqueous solution having the above-described characteristics is coated on the surface of a tile, the CMC aqueous solution is completely decomposed and vanished without changing the tile or its photoluminescent characteristic after a burning process at a predetermined temperature for a period of time. Accordingly, the CMC aqueous solution may be easily used when photoluminescent glaze powder is glazed on the whole surface of a tile.

The adhesive material of the step (b) is coated at a thickness below 0.05 mm to slightly cover the surface of the tile. If the adhesive material is coated too thickly, the CMC aqueous solution may flow from the edge of the tile surface, and fluidity is too great for dry-glazing photoluminescent glaze powder, which prevents delicate operations.

In the step (c), the mixture composition ratio of photoluminescent phosphor:frit:surface-protective frit in the photoluminescent glaze powder is preferably 20~30 wt %:20~30 wt %:50~60 wt %, and the photoluminescent glaze powder is dry-glazed at a thickness ranging from 0.3 to 2.0 mm.

The dry-glazing process is performed by a silk-screen method. The burning temperature and time may be changed depending on mixture ratios of photoluminescent glaze powder. When the surface of the tile is dry-glazed with photoluminescent glaze powder obtained by mixing a small amount of organic pigments for ceramics, a photoluminescent tile having various colors may be fabricated.

Fourth, there is also provided a photoluminescent tile fabricated by wet-glazing photoluminescent glaze aqueous solution on the whole surface of a tile and then burning the tile glazed with the photoluminescent wet-glaze aqueous solution at a temperature ranging from 500 to 1200° C. Here, the photoluminescent glaze aqueous solution is prepared by adding 30~100 weight parts of water to 100 weight parts of photoluminescent glaze powder obtained by dry-mixing a 10~50 wt % photoluminescent phosphor which comprises a compound expressed by $MAl_2O_4$ (M: metal) as a host crystal with a 10~50 wt % frit and a 40~80 wt % surface-protective frit. Here, the photoluminescent glaze power has the different structure from that of the conventional luminous glaze used in fabrication of the conventional luminous tile, and is fabricated by a different method from the conventional process.

In still another embodiment, a fourth method for fabricating the above photoluminescent tile comprises the steps of:

(a) preparing a tile having elaborate patterns or colors;

(b) wet-glazing photoluminescent glaze aqueous solution prepared by adding 30~100 weight parts of water to 100 weight parts of photoluminescent glaze powder obtained by dry-mixing a 10~50 wt % photoluminescent phosphor which comprises a compound expressed by $MAl_2O_4$ (M: metal) as a host crystal with a 10~50 wt % frit and a 40~80 wt % surface-protective frit on the whole surface of the tile; and (c) burning the tile wet-glazed with the photoluminescent glaze aqueous solution at a temperature ranging from 500 to 1200° C.

In the step (b), the mixture composition ratio of photoluminescent phosphor:frit:surface-protective frit in the photoluminescent glaze powder is 20~30 wt %:20~30 wt %:50~60 wt %.

In the step (b), the photoluminescent glaze powder may be stirred with water by using a stirrer or mixing in a ball mill. The composition ratio of powder and water may vary depending on the composition ratio of the photoluminescent glaze powder.

Preferably, the wet-glazing process is performed by a spraying method using a sprayer to result in a uniform thickness of the photoluminescent glaze powder on the whole surface of the tile. The photoluminescent glaze aqueous solution is glazed at a thickness ranging from 0.3 to 2.0 mm.

DETAILED DESCRIPTION OF THE PREFERRED EMBODIMENTS

Figure 1:
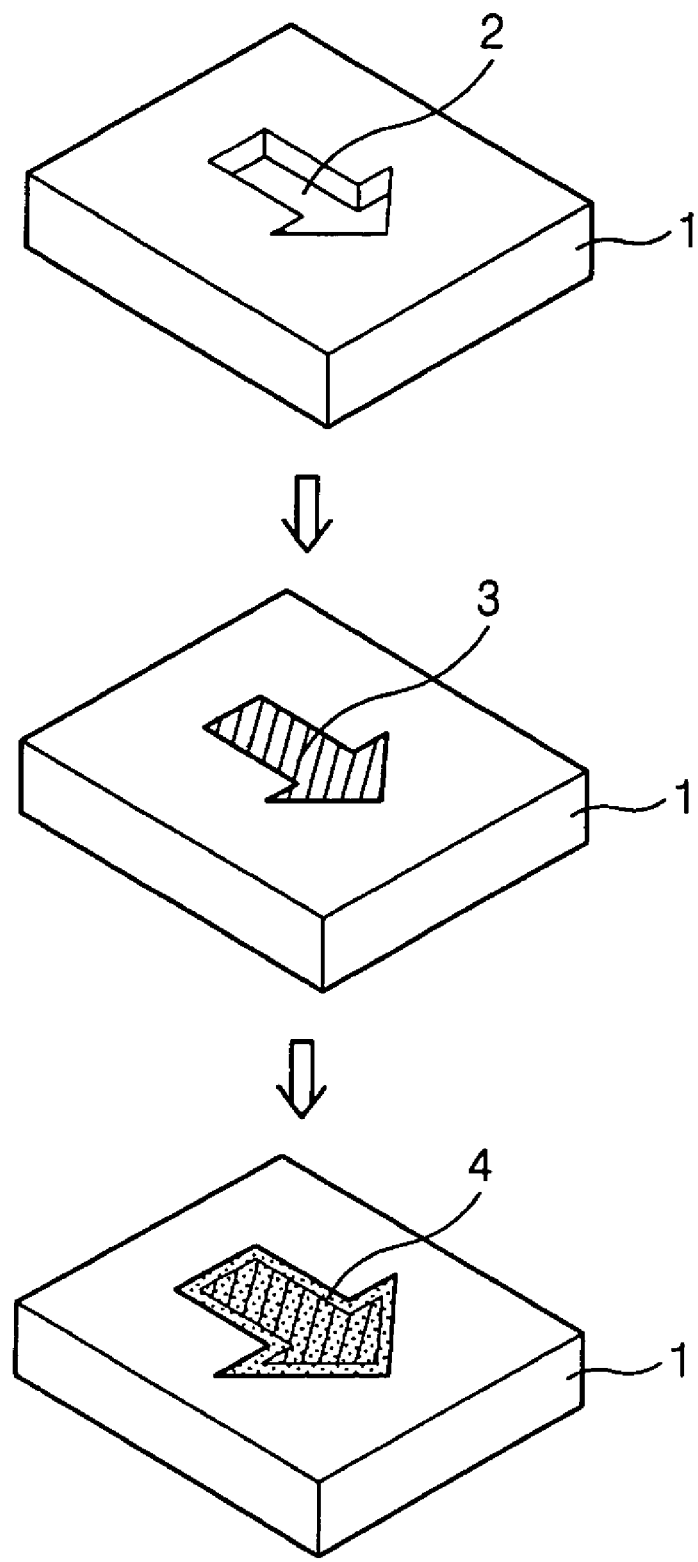
FIG. 1 is a diagram illustrating a method for fabricating a photoluminescent tile by using a tile where grooves are hollowed with predetermined shapes according to an embodiment of the present invention.
Figure 2:
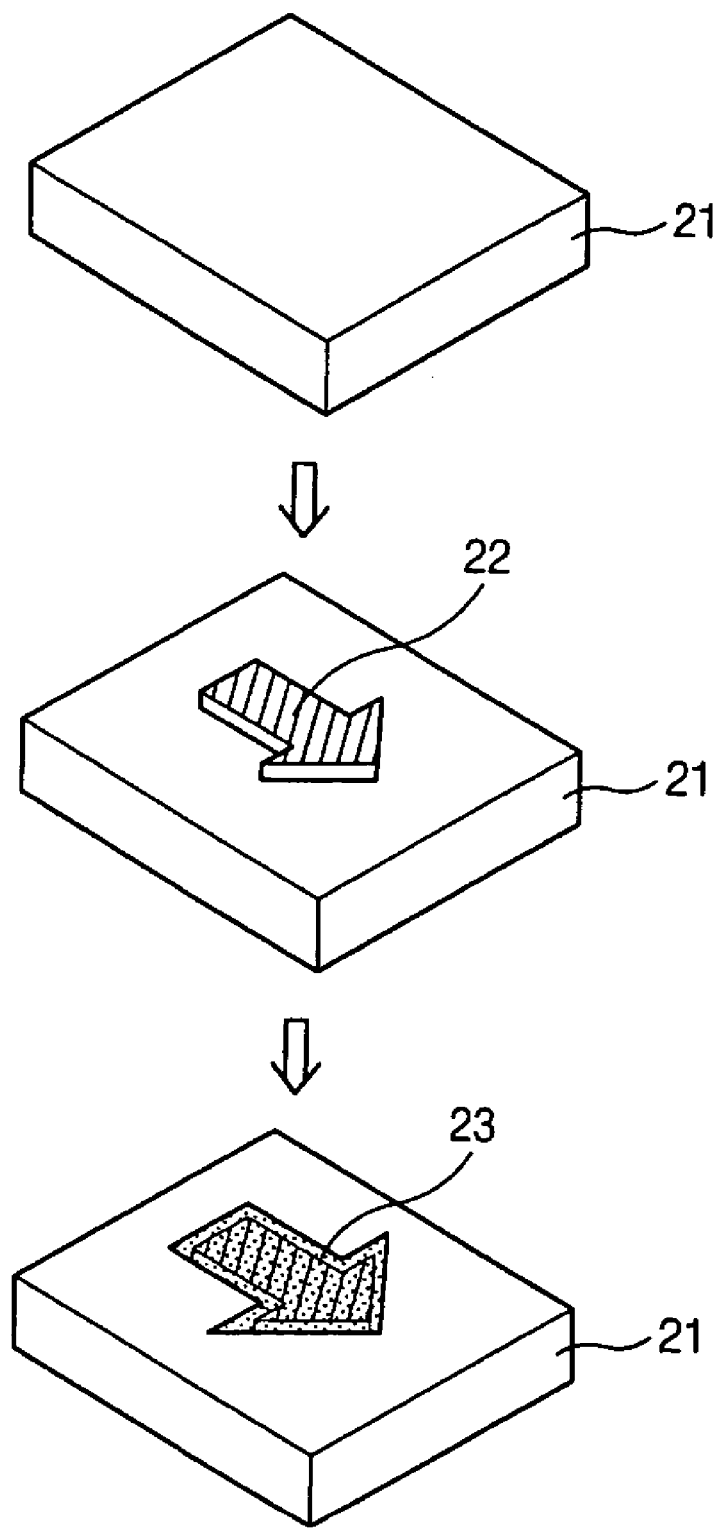
FIG. 2 is a diagram illustrating a method for fabricating a photoluminescent tile by using a flat tile having no pattern according to an embodiment of the present invention.
Figure 3:
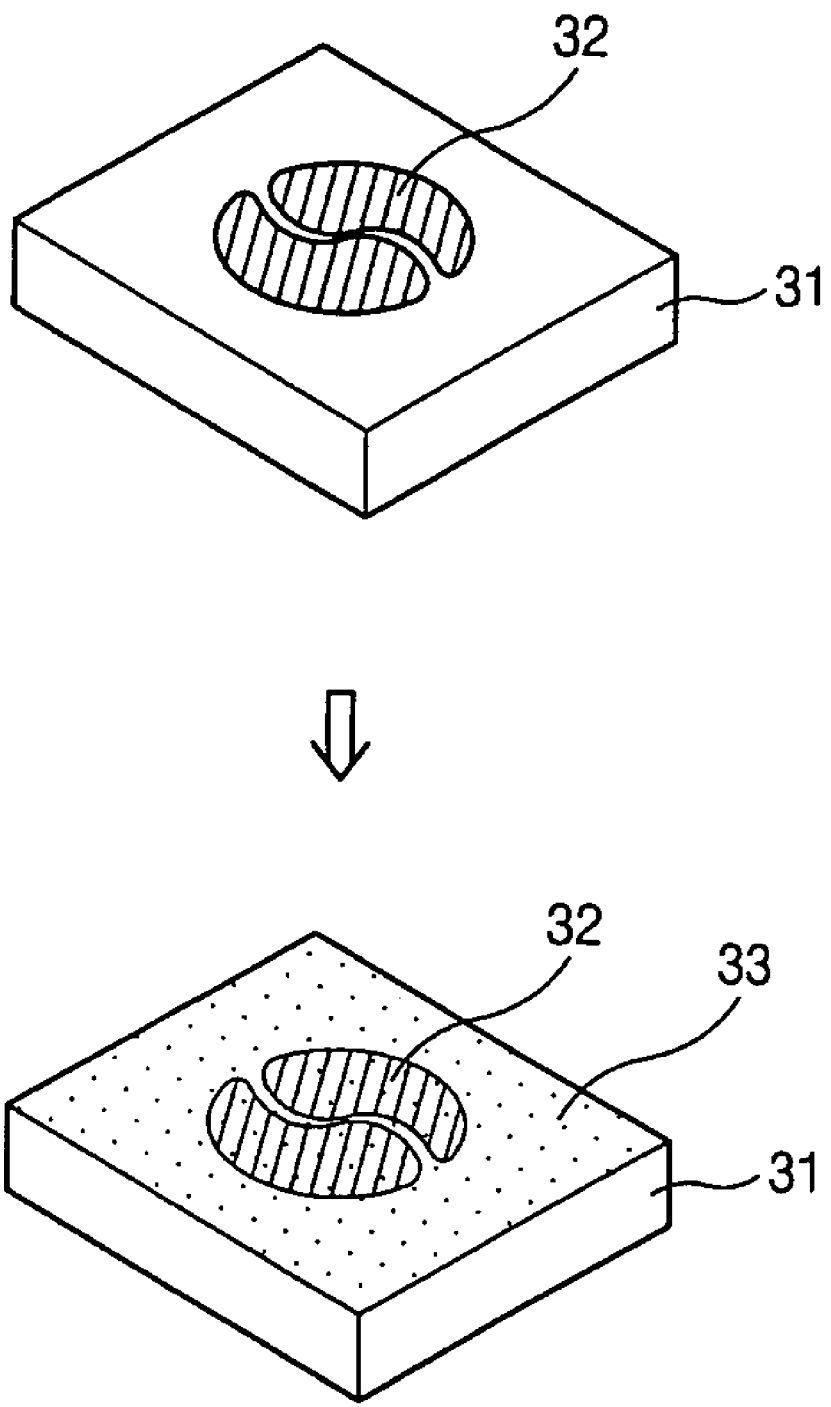
FIG. 3 is a diagram illustrating a method for fabricating a photoluminescent tile by using a tile having elaborate patterns or various colors according to an embodiment of the present invention.
Figure 4:
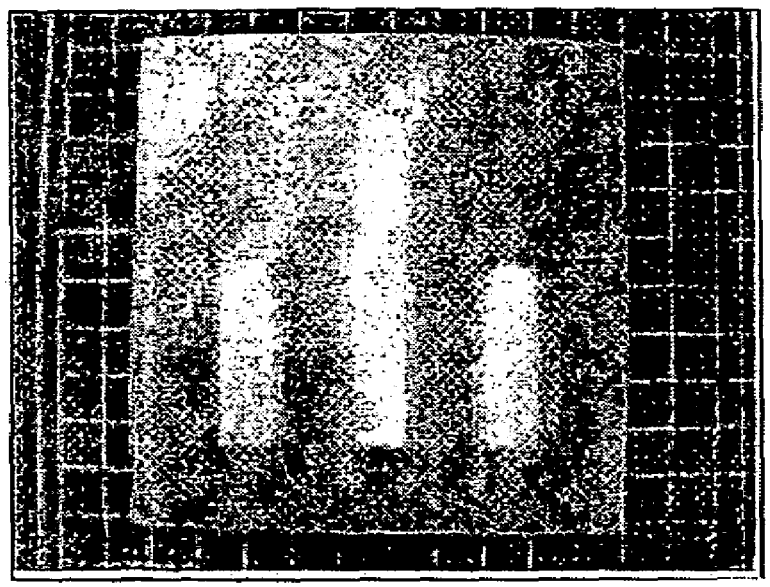
FIG. 4 is a photograph illustrating a photoluminescent tile shown in a light place according to an embodiment of the present invention.
Figure 5:
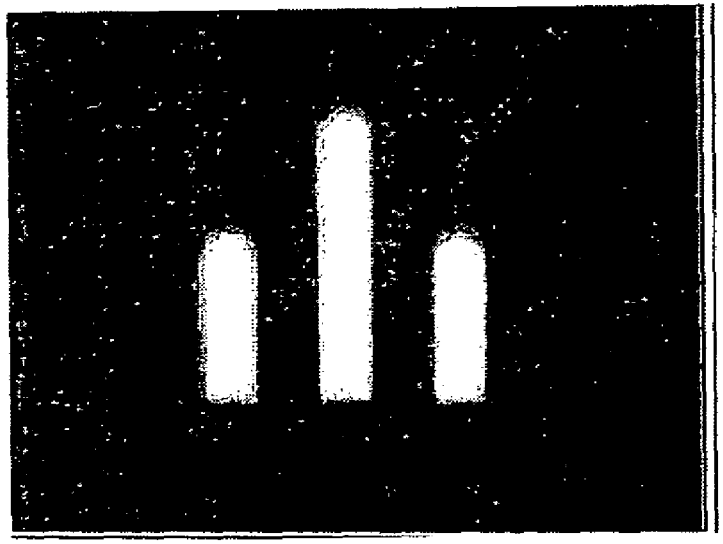
FIG. 5 is a photograph illustrating the photoluminescent tile of FIG. 4 shown in a dark place.
Figure 6:
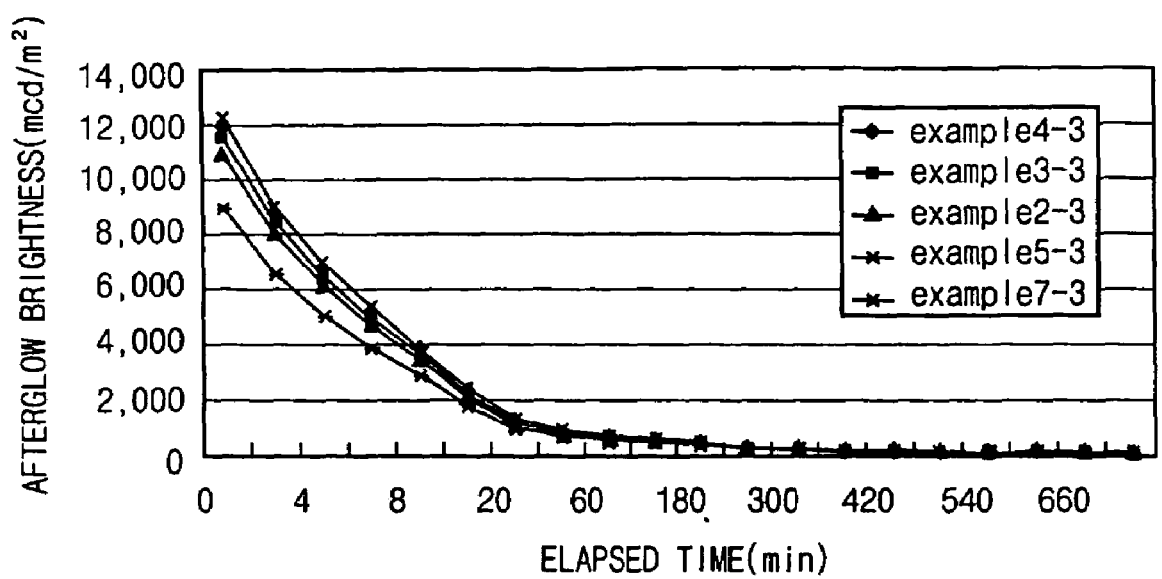
FIG. 6 is a graph illustrating a result obtained by afterglow brightness of the photoluminescent tile according to an embodiment of the present invention.

Hereinafter, the present invention will be described in detail. However, it should be understood that the invention is not limited to the particular forms disclosed.

I. Preparation of Glaze

PREPARATION EXAMPLES 1~4

Preparation of Photoluminescent Glaze Powder

LumiNova® produced by Stone Nemoto Co., Ltd., which comprises a compound expressed by $SrAl_2O_4$ was used as a photoluminescent phosphor to obtain photoluminescent glaze powder according to the present invention. A particle with a predetermined size (60 mesh) obtained by pulverizing (200 mesh) a frit for 800° C. (HeKwang Ceramics Co., Ltd.) and drying the frit was used.

The photoluminescent glaze powder according to the present invention was fabricated by mixing the photoluminescent phosphor powder with the frit powder at predetermined ratios shown in Table 1.

TABLE 1

| | Photoluminescent Phosphor (wt %) | Frit (wt %) |
|---|---|---|
| Preparation Example 1 | 90 | 10 |
| Preparation Example 2 | 80 | 20 |
| Preparation Example 3 | 70 | 30 |
| Preparation Example 4 | 60 | 40 |

PREPARATION EXAMPLES 5~8

Preparation of Photoluminescent Glaze Powder

For a photoluminescent phosphor, LumiNova® (produced by Stone Nemoto Co., Ltd.) including $SrAl_2O_4$ as a host crystal was used. For a frit, a particle with a predetermined size (60 mesh) obtained by pulverizing (200 mesh) a frit (HeGwang Ceramics. Co., Ltd.) for 800° C. and drying the pulverized frit was used. For a surface-protective frit, Vetrosa® (produced by Korea Ceramics Co., Ltd.) for 830° C. was used. The disclosed photoluminescent glaze powder was obtained by mixing the above ingredients.

The photoluminescent glaze powder was fabricated by mixing photoluminescent phosphor, frit and Vetrosa® in the below ratios.

TABLE 2

| | Photoluminescent phosphor (wt %) | Frit (wt %) | Vetrosa (wt %) |
|---|---|---|---|
| Preparation Example 5 | 10 | 20 | 70 |
| Preparation Example 6 | 20 | 20 | 60 |
| Preparation Example 7 | 30 | 20 | 50 |
| Preparation Example 8 | 40 | 20 | 40 |

PREPARATION EXAMPLES 9~12

Preparation of Photoluminescent Glaze Aqueous Solutions

For a photoluminescent phosphor, LumiNova® (produced by Stone Nemoto Co., Ltd.) including $SrAl_2O_4$ as a host crystal was used. For a frit, a particle with a predetermined size (60 mesh) obtained by pulverizing (200 mesh) a frit (HeGwang Ceramics. Co., Ltd.) for 800° C. and drying the pulverized frit was used. For a surface-protective frit, Vetrosa® (produced by Korea Ceramics Co., Ltd.) for 830° C. was used. The disclosed photoluminescent glaze powder was obtained by mixing the above ingredients.

The photoluminescent glaze powder was fabricated by mixing photoluminescent phosphor, frit and Vetrosa® at the below ratios, and then photoluminescent glaze aqueous solution was obtained by adding 50 weight parts of water to 100 weight parts of photoluminescent glaze powder.

TABLE 3

| | Photoluminescent phosphor (wt %) | Frit (wt %) | Surface-protective frit (wt %) | Water (weight parts based on 100 weight parts of photoluminescent glaze powder) |
|---|---|---|---|---|
| Preparation Example 9 | 10 | 20 | 70 | 50 |
| Preparation Example 10 | 20 | 20 | 60 | 50 |
| Preparation Example 11 | 30 | 20 | 50 | 50 |
| Preparation Example 12 | 40 | 20 | 40 | 50 |

PREPARATION EXAMPLES 13~15

Preparation of Conventional Luminous Glazes

The conventional luminous glazes were fabricated by mixing luminous material $SrAl_2O_3$ with frit at the below ratios shown in Table 4, and then adding 50 weight parts of water to 100 weight parts of the mixture.

TABLE 4

| | $SrAl_2O_3$ (wt %) | Frit (wt %) |
|---|---|---|
| Preparation Example 13 | 40 | 60 |
| Preparation Example 14 | 30 | 70 |
| Preparation Example 15 | 20 | 80 |

II. Fabrication of Tile

EXAMPLES 1~5

Fabrication of Flooring Tiles

Raw tile powder was formed as a mold where an arrow pattern (→) was hollowed out. The photoluminescent glaze powders obtained from the Preparation Examples 1~4 were filled in the grooves by using a silk screen device, and the upper portion filled with the photoluminescent glaze powder was dry-glazed with the surface-protective fit (Vetrosa®, Korea Ceramics Co., Ltd.), and burned at a temperature ranging from 500 to 1200° C., thereby obtaining a flooring tile according to the present invention.

Table 5 below shows specific preparation examples depending on the depth of the grooves and kinds of photoluminescent glaze powder.

TABLE 5

| Example Classification | | Depth of groove (mm) | Photoluminescent glaze powder used | Burning temperature and time |
|---|---|---|---|---|
| Example 1 | 1-1 | 0.3 | Preparation Example 1 | 700° C./40 min. |
| | 1-2 | | Preparation Example 2 | 720° C./50 min. |
| | 1-3 | | Preparation Example 3 | 860° C./60 min. |
| | 1-4 | | Preparation Example 4 | 950° C./60 min. |
| | 1-5 | | Preparation Example 4 | 1050° C./60 min. |
| Example 2 | 2-1 | 0.7 | Preparation Example 1 | 700° C./40 min. |
| | 2-2 | | Preparation Example 2 | 720° C./50 min. |

TABLE 5-continued

| Example Classification | | Depth of groove (mm) | Photoluminescent glaze powder used | Burning temperature and time |
|---|---|---|---|---|
| | 2-3 | | Preparation Example 3 | 860° C./60 min. |
| | 2-4 | | Preparation Example 4 | 950° C./60 min. |
| | 2-5 | | Preparation Example 4 | 1050° C./60 min. |
| Example 3 | 3-1 | 1.1 | Preparation Example 1 | 700° C./40 min. |
| | 3-2 | | Preparation Example 2 | 720° C./50 min. |
| | 3-3 | | Preparation Example 3 | 860° C./60 min. |
| | 3-4 | | Preparation Example 4 | 950° C./60 min. |
| | 3-5 | | Preparation Example 4 | 1050° C./60 min. |
| Example 4 | 4-1 | 1.6 | Preparation Example 1 | 700° C./40 min. |
| | 4-2 | | Preparation Example 2 | 720° C./50 min. |
| | 4-3 | | Preparation Example 3 | 860° C./60 min. |
| | 4-4 | | Preparation Example 4 | 950° C./60 min. |
| | 4-5 | | Preparation Example 4 | 1050° C./60 min. |
| Example 5 | 5-1 | 2.0 | Preparation Example 1 | 700° C./40 min. |
| | 5-2 | | Preparation Example 2 | 720° C./50 min. |
| | 5-3 | | Preparation Example 3 | 860° C./60 min. |
| | 5-4 | | Preparation Example 4 | 950° C./60 min. |
| | 5-5 | | Preparation Example 4 | 1050° C./60 min. |

EXAMPLES 6~9

Fabrication of Wall Tiles

The photoluminescent glaze powders obtained from the Preparation Examples 1~4 were dry-glazed to have an arrow pattern (→) on a flat tile having no pattern by using a silk screen device. The upper portion dry-glazed with the photoluminescent glaze powder was dry-glazed with the surface-protective frit (Vetrosa®, Korea Ceramics Co., Ltd.), and burned at a temperature ranging from 500 to 1200° C., thereby obtaining a wall tile according to the present invention.

Table 6 below shows specific tile preparation examples depending on the dry-glazing thickness and kinds of photoluminescent glaze powder used.

TABLE 6

| Example Classification | | Dry-glazed thickness (mm) | Photoluminescent glaze powder used | Burning temperature and time |
|---|---|---|---|---|
| Example 6 | 6-1 | 0.3 | Preparation Example 1 | 700° C./40 min. |
| | 6-2 | | Preparation Example 2 | 720° C./50 min. |
| | 6-3 | | Preparation Example 3 | 860° C./60 min. |
| | 6-4 | | Preparation Example 4 | 950° C./60 min. |
| | 6-5 | | Preparation Example 4 | 1050° C./60 min. |
| Example 7 | 7-1 | 0.7 | Preparation Example 1 | 700° C./40 min. |
| | 7-2 | | Preparation Example 2 | 720° C./50 min. |
| | 7-3 | | Preparation Example 3 | 860° C./60 min. |
| | 7-4 | | Preparation Example 4 | 950° C./60 min. |
| | 7-5 | | Preparation Example 4 | 1050° C./60 min. |
| Example 8 | 8-1 | 1.1 | Preparation Example 1 | 700° C./40 min. |
| | 8-2 | | Preparation Example 2 | 720° C./50 min. |
| | 8-3 | | Preparation Example 3 | 860° C./60 min. |
| | 8-4 | | Preparation Example 4 | 950° C./60 min. |
| | 8-5 | | Preparation Example 4 | 1050° C./60 min. |
| Example 9 | 9-1 | 1.5 | Preparation Example 1 | 700° C./40 min. |
| | 9-2 | | Preparation Example 2 | 720° C./50 min. |
| | 9-3 | | Preparation Example 3 | 860° C./60 min. |
| | 9-4 | | Preparation Example 4 | 950° C./60 min. |
| | 9-5 | | Preparation Example 4 | 1050° C./60 min. |

EXAMPLES 10~13

Fabrication of Mosaic Tiles having Elaborate Patterns or Colors

A mosaic tile having elaborate patterns or colors was prepared by molding general raw powder of a tile. CMC aqueous solution containing 0.5 weight parts of CMC per 100 weight parts of water was coated on the whole surface of the mosaic tile, and then the photoluminescent glaze powder obtained from the Preparation Examples 5~8 was dry-glazed on the whole surface of the tile coated with the CMC aqueous solution using a silk-screen device. Thereafter, the tile dry-glazed with the photoluminescent glaze powder was burned at a temperature ranging from 500 to 1200° C., thereby obtaining a mosaic tile according to an embodiment of the present invention.

The specific tile preparation examples are shown in Table 7.

TABLE 7

| Example Classification | | Dry-glazed thickness (mm) | Photoluminescent glaze solution used | Burning temperature and time |
|---|---|---|---|---|
| Example 10 | 10-1 | 0.3 | Preparation Example 5 | 700° C./40 min. |
| | 10-2 | | Preparation Example 6 | 720° C./50 min. |
| | 10-3 | | Preparation Example 7 | 860° C./60 min. |
| | 10-4 | | Preparation Example 8 | 950° C./60 min. |
| | 10-5 | | Preparation Example 8 | 1050° C./60 min. |
| Example 11 | 11-1 | 0.7 | Preparation Example 5 | 700° C./40 min. |
| | 11-2 | | Preparation Example 6 | 720° C./50 min. |
| | 11-3 | | Preparation Example 7 | 860° C./60 min. |
| | 11-4 | | Preparation Example 8 | 950° C./60 min. |
| | 11-5 | | Preparation Example 8 | 1050° C./60 min. |
| Example 12 | 12-1 | 1.1 | Preparation Example 5 | 700° C./40 min. |
| | 12-2 | | Preparation Example 6 | 720° C./50 min. |
| | 12-3 | | Preparation Example 7 | 860° C./60 min. |
| | 12-4 | | Preparation Example 8 | 950° C./60 min. |
| | 12-5 | | Preparation Example 8 | 1050° C./60 min. |
| Example 13 | 13-1 | 1.5 | Preparation Example 5 | 700° C./40 min. |
| | 13-2 | | Preparation Example 6 | 720° C./50 min. |
| | 13-3 | | Preparation Example 7 | 860° C./60 min. |
| | 13-4 | | Preparation Example 8 | 950° C./60 min. |
| | 13-5 | | Preparation Example 8 | 1050° C./60 min. |

EXAMPLES 14~17

Fabrication of Mosaic Tiles having Elaborate Patterns or Colors

A mosaic tile having elaborate patterns or colors was prepared by molding general raw powder of a tile. The photoluminescent glaze solution obtained from the Preparation Examples 9~12 was wet-glazed on the whole surface of the mosaic tile using a sprayer. Thereafter, the tile wet-glazed with the photoluminescent glaze solution was burned at a temperature ranging from 500 to 1200° C., thereby obtaining a mosaic tile according to an embodiment of the present invention.

The specific tile preparation examples are shown in Table 8.

TABLE 8

| Example Classification | | Dry-glazed thickness (mm) | Photoluminescent glaze solution used | Burning temperature and time |
|---|---|---|---|---|
| Example 14 | 14-1 | 0.3 | Preparation Example 9 | 700° C./40 min. |
| | 14-2 | | Preparation Example 10 | 720° C./50 min. |
| | 14-3 | | Preparation Example 11 | 860° C./60 min. |
| | 14-4 | | Preparation Example 12 | 950° C./60 min. |
| | 14-5 | | Preparation Example 12 | 1050° C./60 min. |
| Example 15 | 15-1 | 0.7 | Preparation Example 9 | 700° C./40 min. |
| | 15-2 | | Preparation Example 10 | 720° C./50 min. |
| | 15-3 | | Preparation Example 11 | 860° C./60 min. |
| | 15-4 | | Preparation Example 12 | 950° C./60 min. |
| | 15-5 | | Preparation Example 12 | 1050° C./60 min. |
| Example 16 | 16-1 | 1.1 | Preparation Example 9 | 700° C./40 min. |
| | 16-2 | | Preparation Example 10 | 720° C./50 min. |
| | 16-3 | | Preparation Example 11 | 860° C./60 min. |
| | 16-4 | | Preparation Example 12 | 950° C./60 min. |
| | 16-5 | | Preparation Example 12 | 1050° C./60 min. |
| Example 17 | 17-1 | 1.5 | Preparation Example 9 | 700° C./40 min. |
| | 17-2 | | Preparation Example 10 | 720° C./50 min. |
| | 17-3 | | Preparation Example 11 | 860° C./60 min. |
| | 17-4 | | Preparation Example 12 | 950° C./60 min. |
| | 17-5 | | Preparation Example 12 | 1050° C./60 min. |

COMPARATIVE EXAMPLES 1~2

Fabrication of Conventional Luminous Tiles

The conventional luminous glaze obtained from the Preparation Examples 13~15 was wet-glazed on the general tiles. Then, the tile was dried at room temperature, and burned at a temperature ranging from 600 to 800° C., thereby obtaining a luminous tile.

The specific tile preparation examples depending on depth of grooves and luminous glaze used are shown in Table 9.

TABLE 9

| Example Classification | | wet-glazed thickness (mm) | Luminous glaze used | Burning temperature and time |
|---|---|---|---|---|
| Comparative Example 1 | 1-1 | 0.3 | Preparation Example 13 | 600° C./40 min. |
| | 1-2 | | Preparation Example 14 | 650° C./50 min. |
| | 1-3 | | Preparation Example 15 | 700° C./60 min. |
| | 1-4 | | Preparation Example 15 | 750° C./60 min. |
| Comparative Example 2 | 2-1 | 1.5 | Preparation Example 13 | 600° C./40 min. |
| | 2-2 | | Preparation Example 14 | 650° C./50 min. |
| | 2-3 | | Preparation Example 15 | 700° C./60 min. |
| | 2-4 | | Preparation Example 15 | 750° C./60 min. |

III. Measuring Experiment on Afterglow Brightness of the Tile

EXPERIMENTAL EXAMPLE 1

Measuring Experiment on Afterglow Brightness of the Disclosed Tile

Table 10 shows results obtained by measuring afterglow brightness of photoluminescent tiles obtained from the Examples 2~5 and 7.

The afterglow brightness of Table 10 was obtained by irradiating 25 W fluorescent light at a distance of 20 cm from the photoluminescent tile for 20 minutes and measuring the light at a reading of 2° of LUMINANCE METER TOPCON BM-8 lens of WookSung Chemicals Co., Ltd. The experiment was performed at a temperature of 21±1° C.

TABLE 10

| Elapsed time (min.) | Afterglow brightness (mcd/m$^2$) | | | | |
|---|---|---|---|---|---|
| | Example 2-3 | Example 3-3 | Example 4-3 | Example 5-3 | Example 7-3 |
| Initial (0) | 11,000 | 11,620 | 12,050 | 12,400 | 9,030 |
| 2 | 8,050 | 8,410 | 8,830 | 9,080 | 6,590 |
| 4 | 6,200 | 6,460 | 6,800 | 7,010 | 5,070 |
| 6 | 4,780 | 4,980 | 5,250 | 5,400 | 3,900 |
| 8 | 3,540 | 3,690 | 3,890 | 4,000 | 2,890 |
| 10 | 2,210 | 2,290 | 2,410 | 2,490 | 1,790 |
| 20 | 1,180 | 1,210 | 1,280 | 1,320 | 950 |
| 30 | 810 | 820 | 855 | 890 | 630 |
| 60 | 640 | 720 | 670 | 710 | 500 |
| 120 | 530 | 540 | 560 | 590 | 415 |
| 180 | 430 | 440 | 450 | 480 | 340 |
| 240 | 283 | 290 | 300 | 320 | 230 |
| 300 | 190 | 193 | 200 | 220 | 151 |
| 360 | 103 | 110 | 115 | 130 | 86 |
| 420 | 80 | 84 | 90 | 100 | 65 |
| 480 | 60 | 63 | 70 | 80 | 50 |
| 540 | 33 | 37 | 40 | 48 | 24 |
| 600 | 24 | 27 | 30 | 36 | 18 |
| 660 | 10 | 13 | 15 | 18 | 8 |
| 720 | 5 | 6 | 8 | 9 | 3 |

EXPERIMENTAL EXAMPLE 2

Measuring Experiment on Afterglow Brightness of the Disclosed Tiles

Table 11 shows results obtained by measuring afterglow brightness of photoluminescent tiles obtained from the Examples 10~13.

The afterglow brightness of Table 11 was obtained by irradiating 25 W fluorescent light at a distance of 20 cm from the photoluminescent tile for 20 minutes and measuring the light at a reading of 2° of LUMINANCE METER TOPCON BM-8 lens of WookSung Chemicals Co., Ltd. The experiment was performed at a temperature of 21±1° C.

TABLE 11

| Elapsed time (min.) | Afterglow brightness (mcd/m$^2$) | | | |
|---|---|---|---|---|
| | Example 10-3 | Example 11-3 | Example 12-3 | Example 13-3 |
| Initial (0) | 3,180 | 3,900 | 4,330 | 5,420 |
| 2 | 1,710 | 1,756 | 1,950 | 3,440 |
| 4 | 1,020 | 1,050 | 1,270 | 1,580 |
| 6 | 610 | 630 | 760 | 950 |
| 8 | 455 | 470 | 590 | 740 |
| 10 | 330 | 350 | 440 | 550 |
| 20 | 210 | 225 | 310 | 390 |
| 30 | 142 | 155 | 200 | 250 |
| 60 | 85 | 95 | 125 | 160 |
| 120 | 45 | 51 | 68 | 88 |
| 180 | 22 | 26 | 45 | 60 |
| 240 | 13 | 17 | 22 | 31 |
| 300 | 7 | 9 | 12 | 20 |
| 360 | 3 | 5 | 6 | 10 |

EXPERIMENTAL EXAMPLE 3

Measuring Experiment on Afterglow Brightness of the Disclosed Tiles

Table 12 shows results obtained by measuring afterglow brightness of photoluminescent tiles obtained from the Examples 14~17.

The afterglow brightness shown in Table 12 was obtained by irradiating 25 W fluorescent light at a distance of 20 cm from the photoluminescent tile for 20 minutes and measuring the light at a reading of 2° of LUMINANCE METER TOPCON BM-8 lens of WookSung Chemicals Co., Ltd. The experiment was performed at a temperature of 21±1° C.

TABLE 12

| Elapsed time (min.) | Afterglow brightness (mcd/m$^2$) | | | |
|---|---|---|---|---|
| | Example 14-3 | Example 15-3 | Example 16-3 | Example 17-3 |
| Initial (0) | 2,540 | 3,210 | 3,820 | 4,500 |
| 2 | 1,310 | 1,450 | 1,660 | 3,110 |
| 4 | 887 | 916 | 1,050 | 1,210 |
| 6 | 470 | 560 | 680 | 830 |
| 8 | 399 | 416 | 527 | 696 |
| 10 | 287 | 301 | 411 | 503 |
| 20 | 196 | 196 | 277 | 325 |
| 30 | 122 | 138 | 186 | 214 |
| 60 | 58 | 76 | 98 | 123 |
| 120 | 36 | 45 | 63 | 72 |
| 180 | 11 | 19 | 32 | 51 |
| 240 | 8 | 13 | 16 | 24 |
| 300 | 3 | 5 | 8 | 13 |
| 360 | — | 2 | 3 | 7 |

EXPERIMENTAL EXAMPLE 4

Measuring Experiment on Afterglow Brightness of the Conventional Luminous Tiles

Table 13 shows results obtained by measuring afterglow brightness 13 luminous tiles obtained from the Comparative Examples 1~2.

The afterglow brightness shown in Table 13 was obtained by irradiating 25 W fluorescent light at a distance of 20 cm from the photoluminescent tile for 20 minutes and measuring the light at a reading of 2° with a LUMINANCE METER TOPCON BM-8 lens of WookSung Chemicals Co., Ltd. The experiment was performed at a temperature of 21±1° C.

TABLE 13

| Elapsed time (min.) | Afterglow brightness (mcd/m$^2$) | |
|---|---|---|
| | Comparative Example 1-3 | Comparative Example 2-3 |
| Initial (0) | 2,240 | 3,510 |
| 2 | 1,130 | 2,675 |
| 4 | 750 | 1,020 |
| 6 | 390 | 682 |
| 8 | 324 | 565 |
| 10 | 230 | 405 |
| 20 | 153 | 254 |
| 30 | 92 | 160 |
| 60 | 41 | 87 |
| 120 | 22 | 43 |
| 180 | 6 | 28 |
| 240 | 4 | 13 |

IV. Yield of Conventional Luminous Tiles and Disclosed Photoluminescent Tiles

EXPERIMENTAL EXAMPLE 5

Comparison Results on Acceptable Ratio of Conventional Luminous Tiles and Disclosed Photoluminescent Tiles Table 14 shows the comparison results of defective yield between the flooring tiles obtained from the Examples 1~5 and the Comparative Examples 1~2 per 100 tiles.

The tiles were examined with unaided eyes from a distance ranging from 50 to 60 cm under 25 W fluorescent light to judge the acceptability of the tiles, and defective products were re-examined by using venier calipers made by Mitutoyo Co., Ltd.

TABLE 14

| Classification (acceptable standard) | | | Comparative example 1~2 (number of tiles) | Example 1~5 (number of tiles) |
|---|---|---|---|---|
| Crack | Width | Less than 0.5 mm | 17 | 3 |
| | Length | Less than 2.0 mm | | |
| Surface swelling | Diameter | Less than 1.0 mm | 13 | 3 |
| Surface pinhole | Diameter | Less than 0.5 mm | 10 | 2 |
| Other | | | 5 | 2 |
| Total | | | 45 | 10 |

After review of the above results obtained from the above-described experiments, as shown in Table 10, the photoluminescent tile according to the present invention showed an excellent afterglow brightness of over 100 mcd/m$^2$ 5 hours after light was blocked when irradiated with a fluorescent light for 20 minutes, and maintained the brightness of at least 3 mcd/m² 12 hours after the light was blocked.

As shown in Table 11, the photoluminescent tile according to the present invention showed an excellent afterglow brightness of almost 100 mcd/m² 1 hour after light was blocked when irradiated with a fluorescent light for 20 minutes, and maintained characteristics of the photoluminescent tile with its native patterns and colors.

As shown in Table 12, the photoluminescent tile according to the present invention showed an excellent afterglow brightness of over 100 mcd/m² 30 minutes after light was blocked when irradiated with a fluorescent light for 20 minutes, and maintained characteristics of the photoluminescent tile with its native patterns and colors. As a result, mass production of products is enabled through automation, thereby improving yield and productivity.

As shown in Tables 13 and 14, the disclosed photoluminescent tile has a greatly improved afterglow brightness than a conventional luminous tile by two times. Furthermore, crazing of the surface of the tile is prevented by using dry-glazed photoluminescent glaze powder. Accordingly, conventional problems such as cracking, surface swelling, surface pin-hole and gloss degradation of conventional tiles obtained by using conventional luminous glaze are solved, thereby reducing defectiveness of the products.

INDUSTRIAL APPLICABILITY

As discussed earlier, a photoluminescent tile according to the present invention which has a photoluminescent characteristic of radiating in the dark may be effectively used as a representative sign for emergency use when power is not supplied, and as an advertisement substitute, which brings about economical effects such as power reduction. Also, the photoluminescent tiles may be applied to various fields as decorative tiles and driving lanes of roads because it maintains its original elaborate patterns and various colors in the daytime, with the light on, and also obtains its photoluminescent characteristic in the dark.

It will be apparent to those skilled in the art that various modifications and variations can be made in the disclosed structures and methods without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A photoluminescent tile fabricated by filling or dry-glazing a photoluminescent glaze powder in a tile, wherein the photoluminescent glaze powder is obtained by dry-mixing a 50~90 wt % photoluminescent phosphor which comprises a compound expressed by $MAl_2O_4$ (M: metal) as a host crystal with a 10~50 wt % frit, and then burning the tile dry-glazed or filled with the photoluminescent glaze powder at a temperature ranging from 500 to 1200° C.

2. The photoluminescent tile according to claim 1, wherein metal M is selected from a group consisting of calcium (Ca), strontium (Sr), barium (Ba), and mixtures thereof.

3. The photoluminescent tile according to claim 1, wherein metal M is an alloy of magnesium (Mg) and a metal selected from a group consisting of Ca, Sr, Ba and mixtures thereof.

4. The photoluminescent tile according to claims 1, wherein the photoluminescent phosphor comprises europium (Eu) as an activator, and at least one or more co-activator selected from a group consisting of cerium (Ce), praseodymium (Pr), neodymium (Nd), samarium (Sm), dysprosium (Dy), holomium (Ho), erbium (Er), thulium (Tm), ytterbium (Yb) and lutetium (Lu).

5. The photoluminescent tile according to claims 1, wherein the tile filled with the photoluminescent glaze powder is a tile wherein grooves are hollowed at a depth ranging from 0.3 to 2.0 mm.

6. The photoluminescent tile according to claim 5, wherein the grooves have shapes of various patterns or representative signs.

7. The photoluminescent tile according to claim 1, wherein the photoluminescent glaze powder is dry-glazed at a thickness ranging from 0.3 to 2.0 mm.

8. The photoluminescent tile according to claims 1, wherein the filling or dry-glazing process is performed by a silk screen method.

9. A photoluminescent tile fabricated by dry-glazing photoluminescent glaze powder on the whole surface of a tile coated with an adhesive material, wherein the photoluminescent glaze powder is obtained by dry-mixing a 10~50 wt % photoluminescent phosphor which comprises a compound expressed by $MAl_2O_4$ (M: metal) as a host crystal with a 10~50 wt % frit and a 40~80 wt % surface-protective frit, and then burning the tile dry-glazed with the photoluminescent glaze powder at a temperature ranging from 500 to 1200° C.

10. The photoluminescent tile according to claim 9, wherein the mixture composition ratio of photoluminescent phosphor:frit:surface-protective frit in the photoluminescent glaze powder is 20~30 wt %:20~30 wt %:50~60 wt %.

11. The photoluminescent tile according to claims 9, wherein the photoluminescent glaze powder is dry-glazed at a thickness ranging from 0.3 to 2.0 mm.

12. A photoluminescent tile fabricated by wet-glazing photoluminescent glaze aqueous solution on the whole surface of a tile and then burning the tile wet-glazed with the photoluminescent glaze aqueous solution at a temperature ranging from 500 to 1200° C., the photoluminescent glaze aqueous solution being prepared by adding 30~100 weight parts of water in 100 weight parts of photoluminescent glaze powder obtained by dry-mixing a 10~50 wt % photoluminescent phosphor which comprises a compound expressed by $MAl_2O_4$ (M: metal) as a host crystal with a 10~50 wt % frit and a 40~80 wt % surface-protective frit.

13. The photoluminescent tile according to claim 1, wherein a photoluminescent tile is fabricated by filling or dry-glazing a photoluminescent glaze powder in a tile, wherein the photoluminescent glaze powder is obtained by dry-mixing a 50~90 wt % photoluminescent phosphor which comprises a compound expressed by $MAl_2O_4$ (M: metal) as a host crystal with a 10~50 wt % leadless frit, dry-glazing a surface-protective frit over the tile dry-glazed or filled with the photoluminescent glaze powder and then burning the tile dry-glaze or filled with the photoluminescent glaze powder at a temperature ranging from 500 to 1200° C.

14. A method for fabricating a photoluminescent tile, comprising the steps of:
(a) preparing a tile wherein grooves are hollowed in predetermined shapes;
(b) filling a photoluminescent glaze powder in the grooves, wherein the photoluminescent glaze powder is obtained by dry-mixing a 50~90 wt % photoluminescent phosphor which comprises a compound expressed by $MAl_2O_4$ (M: metal) as a host crystal with a 10~50 wt % frit;

(c) dry-glazing a surface-protective frit on the upper portion of the tile where the photoluminescent glaze powder is filled; and (d) burning the tile dry-glazed with the surface-protective frit at a temperature ranging from 500 to 1200° C.

15. The method according to claim 14, wherein the grooves of the tile in the step (a) are formed to have various patterns or representative signs with cast molding or carving.

16. The method according to claim 14, wherein the grooves of the tile in the step (a) have a depth ranging from 0.3 to 2.0 mm.

17. The method according to claims 14, wherein the filling process in the step (b) is performed by a silk screen device.

18. The method according to claims 14, wherein the surface-protective frit in the step (c) is a low temperature burning frit usable at a temperature ranging from 500 to 900° C. or a high temperature burning frit usable at a temperature ranging from 900 to 1200° C.

19. The method according to claims 14, wherein metal M is (i) selected from a group consisting of calcium (Ca), strontium (Sr), barium (Ba) and mixtures thereof, or is (ii) an alloy of the metal of (i) and magnesium (Mg).

20. The method according to claims 14, wherein the photoluminescent phosphor comprises europium (Eu) as an activator, and at least one or more co-activator selected from the group consisting of cerium (Ce), praseodymium (Pr), neodymium (Nd), samarium (Sm), dysprosium (Dy), holomium (Ho), erbium (Er), thulium (Tm), ytterbium (Yb) and lutetium (Lu).

21. A method for fabricating a photoluminescent tile, comprising the steps of:

(a) preparing a flat tile having no pattern;

(b) dry-glazing photoluminescent glaze powder on the tile in predetermined shapes, wherein the photoluminescent glaze powder is obtained by dry-mixing a 50~90 wt % photoluminescent phosphor which comprises a compound expressed by $MAl_2O_4$ (M: metal) as a host crystal with a 10~50 wt % frit;

(c) dry-glazing a surface-protective frit on the upper portion of the tile where the photoluminescent glaze powder is dry-glazed; and (d) burning the tile dry-glazed with the surface-protective frit at a temperature ranging from 500 to 1200° C.

22. The method according to claim 21, wherein the photoluminescent glaze powder in the step (b) is dry-glazed as various patterns or representative signs by a silk screen method.

23. The method according to claim 21, wherein the photoluminescent glaze powder is dry-glazed at a thickness ranging from 0.3 to 2.0 mm.

24. The method according to claims 21, wherein the surface-protective frit in the step (c) is a low temperature burning frit usable at a temperature ranging from 500 to 900° C. or a high temperature burning frit usable at a temperature ranging from 900 to 1200° C.

25. The method according to claims 21, wherein metal M is (i) selected from calcium (Ca), strontium (Sr), barium (Ba) and mixtures thereof, or is (ii) an alloy of the metal of (i) and magnesium (Mg).

26. The method according to claims 21, wherein the photoluminescent phosphor comprises europium (Eu) as an activator, and at least one or more co-activator selected from the group consisting of cerium (Ce), praseodymium (Pr), neodymium (Nd), samarium (Sm), dysprosium (Dy), holomium (Ho), erbium (Er), thulium (Tm), ytterbium (Yb) and lutetium (Lu).

27. A method for fabricating a photoluminescent tile, comprising the steps of:

(a) preparing a tile having elaborate patterns and/or various colors;

(b) coating an adhesive material on the whole surface of the tile;

(c) dry-glazing photoluminescent glaze powder on the whole surface of the tile coated with the adhesive material, wherein the photoluminescent glaze powder obtained by dry-mixing a 10~50 wt % photoluminescent phosphor which comprises a compound expressed by $MAl_2O_4$ (M: metal) as a host crystal with a 10~50 wt % frit and a 40~80 wt % surface-protective frit; and (d) burning the tile whose whole surface is dry-glazed with the photoluminescent glaze powder at a temperature ranging from 500 to 1200° C.

28. The method according to claim 27, wherein the adhesive material of the step (b) is fabricated by mixing 0.5~5 weight parts of sodium carboxylmethyl cellulose in 100 weight parts of water.

29. The method according to claim 27, wherein the mixture composition ratio of photoluminescent phosphor:frit:surface-protective frit in the photoluminescent glaze powder by a dry-mixing method is 20~30 wt %:20~30 wt %:50~60 wt %.

30. The method according to claims 27, wherein the surface-protective frit of the step (c) is a low temperature burning frit usable at a temperature ranging from 500 to 900° C. or a high temperature burning frit usable at a temperature ranging from 900 to 1200° C.

31. The method according to claims 27, wherein the photoluminescent glaze powder is dry-glazed at a thickness ranging from 0.3 to 2.0 mm.

32. The method according to claims 27 to 31, wherein the dry-glazing processes is performed by a silk-screen method.

33. A method for fabricating a photoluminescent tile, comprising the steps of:

(a) preparing a tile having elaborate patterns or colors;

(b) wet-glazing photoluminescent glaze aqueous solution on the whole surface of the tile, wherein the photoluminescent glaze aqueous solution is prepared by adding 30~100 weight parts of water in 100 weight parts of photoluminescent glaze powder obtained by dry-mixing a 10~50 wt % photoluminescent phosphor which comprises a compound expressed by $MAl_2O_4$ (M: metal) as a host crystal with a 10~50 wt % frit and a 40~80 wt % surface-protective frit; and (c) burning the tile wet-glazed with the photoluminescent glaze aqueous solution at a temperature ranging from 500 to 1200° C.

34. The method according to claim 33, wherein the mixture composition ratio of photoluminescent phosphor:frit:surface-protective frit in the photoluminescent glaze powder is 20~30 wt %:20~30 wt %:50~60 wt %.

35. The method according to claim 33, wherein the wet-glazing process is performed by a spraying method using a sprayer.

36. The method according to claims 33, wherein the photoluminescent glaze aqueous solution is wet-glazed at a thickness ranging from 0.3 to 2.0 mm.

* * * * *